UNITED STATES PATENT OFFICE.

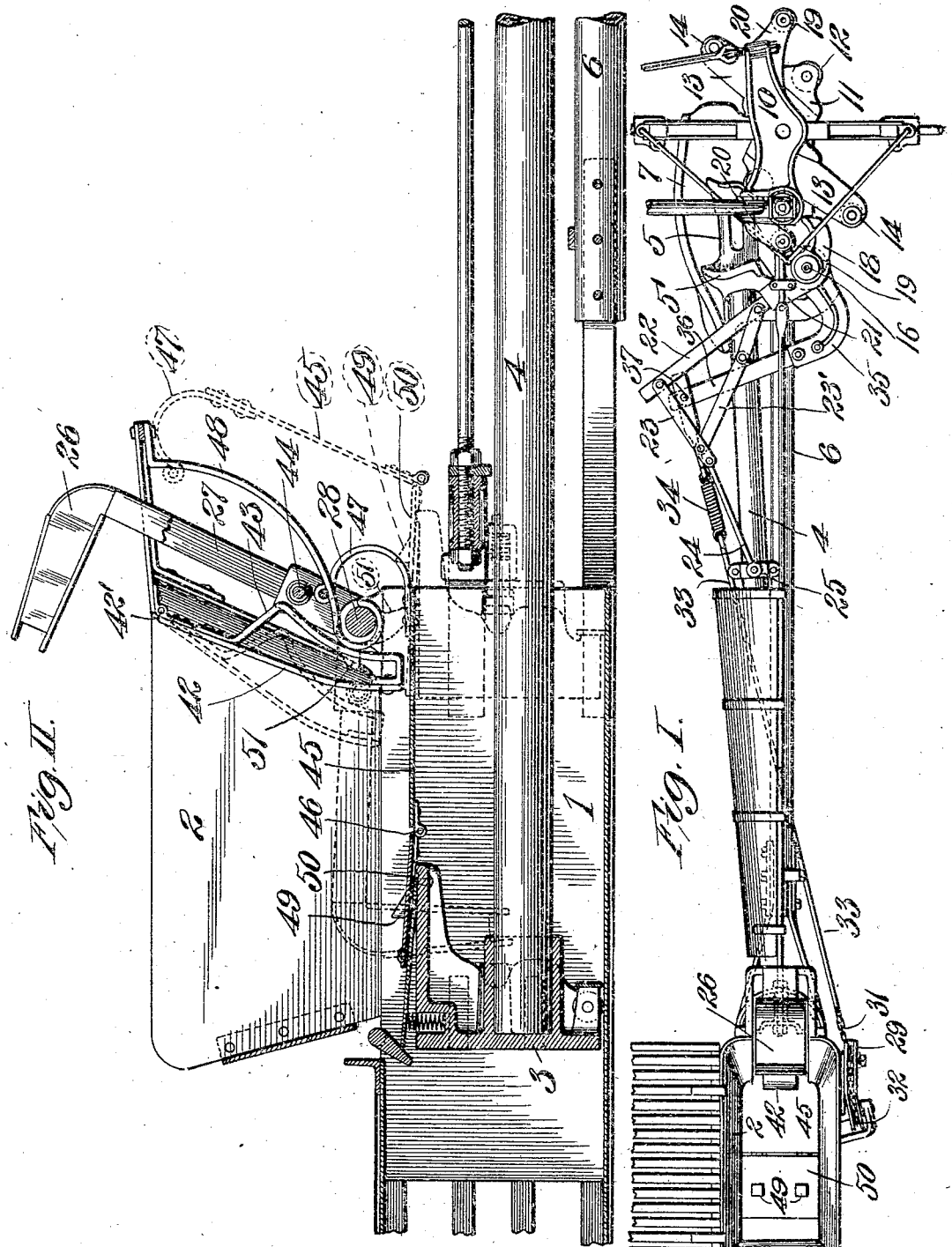

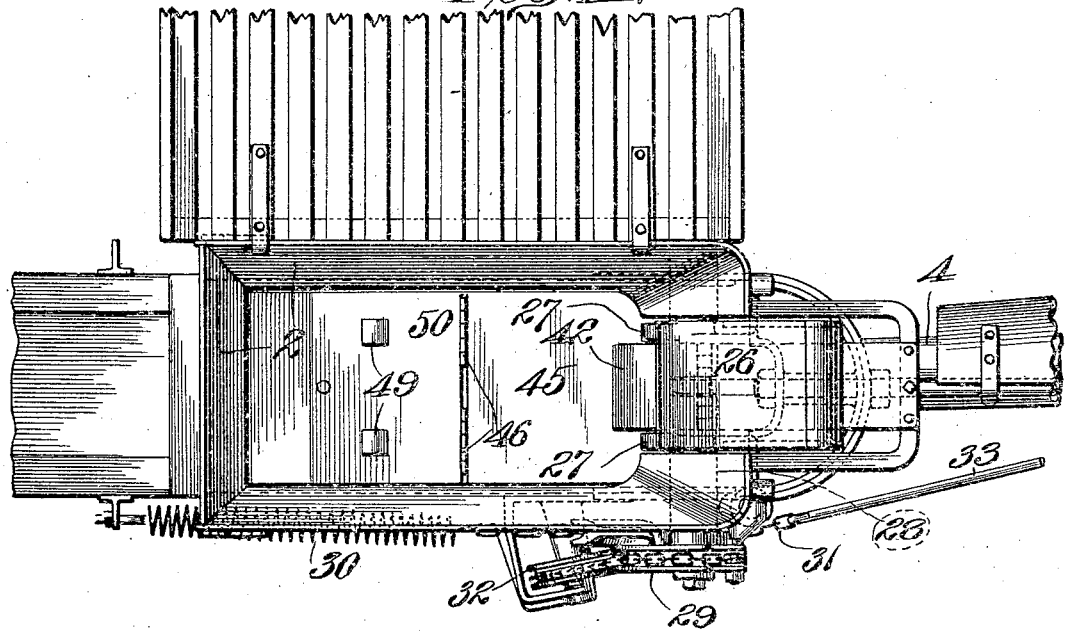
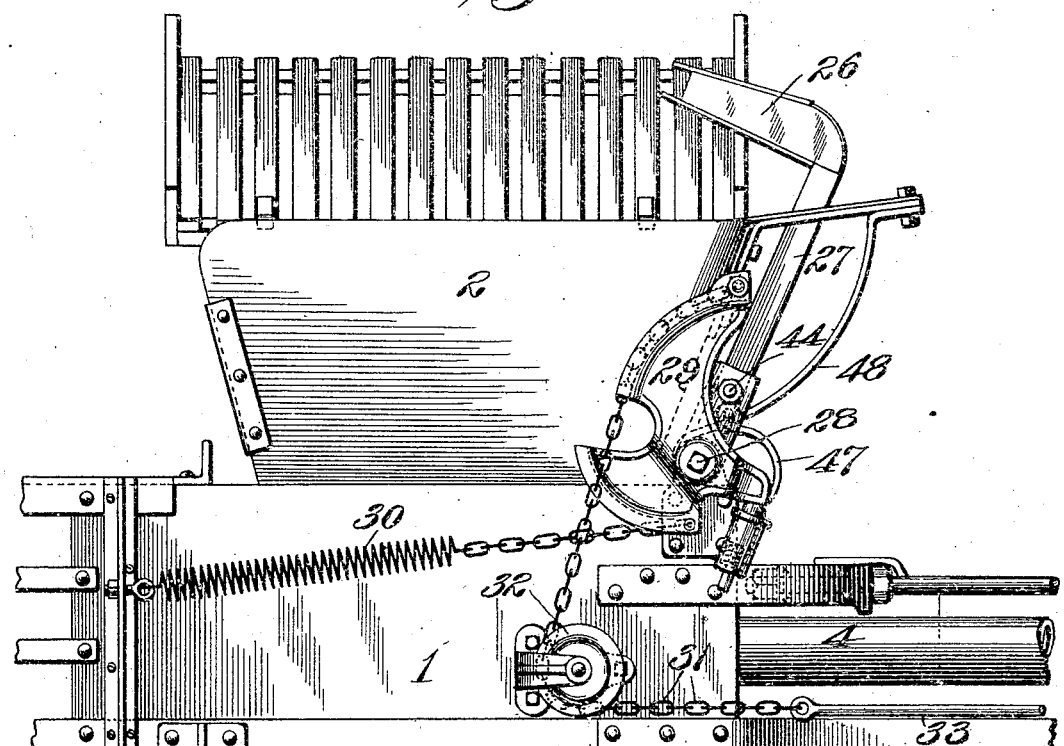

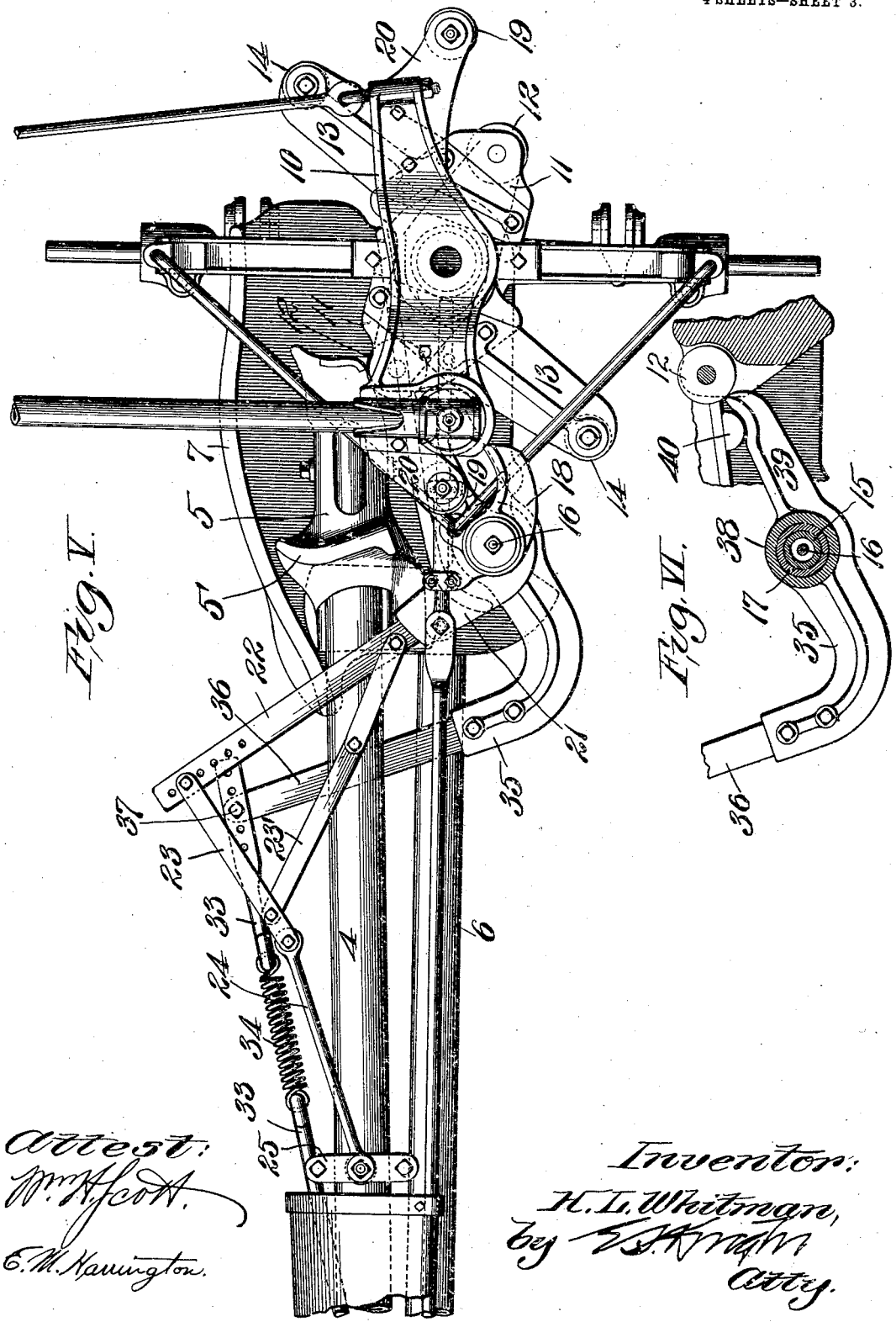

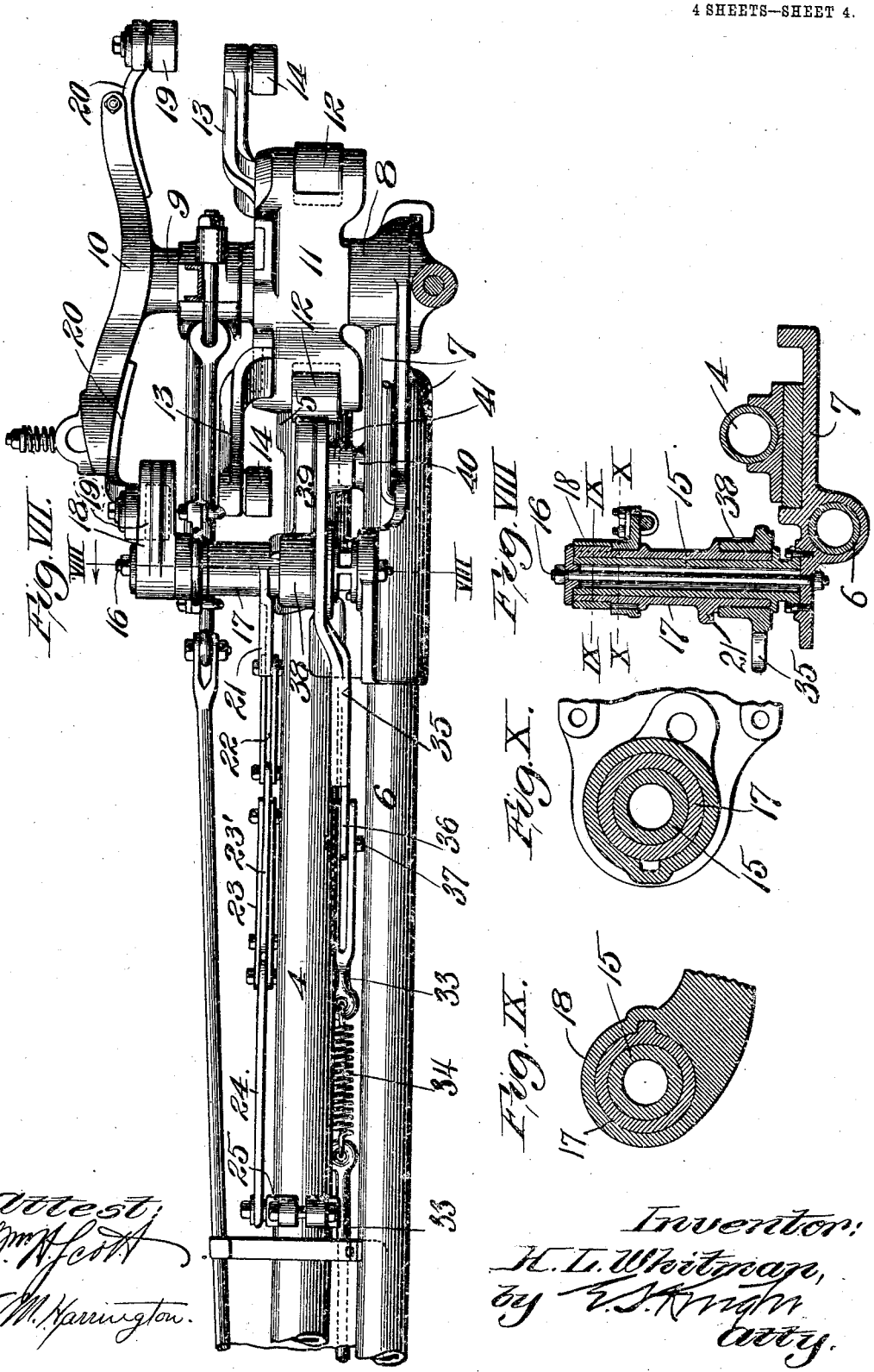

HENRY L. WHITMAN, OF ST. LOUIS, MISSOURI.

BALING-PRESS.

954,067.

Specification of Letters Patent. Patented Apr. 5, 1910.

Application filed February 6, 1909. Serial No. 476,547.

*To all whom it may concern:*

Be it known that I, HENRY L. WHITMAN, a citizen of the United States of America, residing in the city of St. Louis and State of Missouri, have invented certain new and useful Improvements in Baling-Presses, of which the following is a full, clear, and exact description, reference being made to the accompanying drawings, forming part of this specification.

My invention relates more particularly to mechanisms in a baling press whereby the plunger and pitman may be retracted after pressing the charge of material being baled, and whereby the feeder may be operated from the power end of the press, both of these operations being carried out independently of each other.

My invention further relates to means actuated by the feeder whereby the charge of material being baled may be forced forwardly in the feed hopper, during the descent of the feeder, to be properly delivered in front of the plunger.

My invention further relates to a folding guard beneath the feed hopper and movable with the plunger of the baling press, and to means whereby said guard may act to elevate the feeder.

Figure I is a top or plan view of my baling press. Fig. II is an enlarged vertical longitudinal section through the baling chamber and feed hopper of my baling press. Fig. III is an enlarged top or plan view of the baling chamber, feed hopper, feeder, and feeder operating means. Fig. IV is a side elevation of the parts shown in Fig. III. Fig. V is an enlarged top or plan view of the power mechanism. Fig. VI is a view partly in plan and partly in horizontal section of the lever in the power mechanism constituting a part of the feeder operating mechanism, a fragment of the bed plate, and a fragment of the power head. Fig. VII is an enlarged side elevation of the power mechanism. Fig. VIII is a vertical cross section taken on line VIII—VIII, Fig. VII, looking in the direction indicated by the arrow crossing said line. Fig. IX is an enlarged horizontal section taken on line IX—IX, Fig. VIII. Fig. X is an enlarged horizontal section taken on line X—X, Fig. VIII.

In the accompanying drawings: 1 designates the baling chamber of my press, and 2 the feed hopper above said chamber.

3 is the plunger operable in the baling chamber, 4 the pitman, and 5 the pitman head.

6 is a reach extending from the baling chamber to the power end of the press and having fixed to it at the power end a bed member 7.

8 is a column surmounting the outer end of the bed member 7 and to which is rockably fitted the sweep-head post 9 of the sweep head 10.

11 is the power head fixed to the sweep-head post, and at the ends of which are mounted rollers 12, (see Figs. I and V to VII, inclusive.) This power head is also provided with a pair of arms 13 that carry rollers 14. The rollers 14 are adapted to engage the flange 5' of the pitman head 5 to impart initial forward movement to the pitman 4, while the rollers 12 are adapted to move into engagement with the end of the pitman head for the purpose of completing its forward stroke.

All of the parts thus far described are old, and no invention *per se* is herein claimed for them.

Referring now to the mechanism employed in my press for retracting the plunger and pitman after they have been moved forwardly for the compression of material delivered into the baling chamber of the press, 15 (see Figs. VIII to X, inclusive,) designates a post surmounting the inner end of the bed member 7, by which the power mechanism is supported, and which is preferably maintained in an upright position upon said bed member by a stay rod 16 that passes vertically through the post.

17 is a vertical sleeve loosely fitted to the post 15 so as to be rotatable thereon. This sleeve has fixed to it a lever arm 18 that extends normally in a rearward direction and is adapted to be engaged by either of a pair of anti-friction rollers 19 that are journaled to arms 20 carried by the sweep head 10, (Fig. VII.)

21 is a lever arm carried by the rotatable sleeve 17 and extending from said sleeve toward the pitman 4. This lever arm 21 is provided with a lever 22 that extends across the pitman, (seen most clearly in Figs. I and V,) to the free end of which is adjustably connected a link 23. The link 23 is connected at its forward end to a pull-rod 24 that is attached by suitable means to the pitman 4, the means for such attachment being preferably a shackle 25.

23' is a flexible jointed stay rod that unites the forward end of the link 23 to the inner end of the lever 22.

It will be understood from the foregoing description that when the sweephead 10 is rotated the anti-friction rollers 19 will be alternately brought into engagement with the lever arm 18 carried by the sleeve 17, and said sleeve will have a partial rotation imparted to it with the result of moving the lever 22 rearwardly, whereby the pull connections between said lever and the pitman are brought into action to retract the pitman and the plunger carried thereby. This operation of course, takes place after the forward stroke of the pitman and plunger has taken place for the compression of a charge of material in the baling chamber of the press.

Referring now to the feeder and feeder operating means, the feeder comprises a head 26 and a pair of arms 27 that are fixed to a rock shaft 28 journaled in suitable supports on the baling chamber 1. The rock shaft 28 has fixed to it at one end a crank or lever 29 preferably of segmental shape and to it is connected a retracting spring 30 (Figs. III and IV) by which the feeder is normally retained in an elevated position and returned to an elevated position after it has been lowered for feeding action. The lever 29 also has connected to it a pull chain 31 that passes from the lever to, and beneath, a sheave 32 and is attached to a pull rod 33 that leads toward the power end of the press from the baling chamber. In this pull rod is a spring 34 that is introduced into the rod for the purpose of affording resiliency therein in the event of too much strain being imposed upon the feeder and the parts by which it is operated, such as would be occasioned by the introduction of too large a charge into the feed hopper.

35 designates a lever having an arm 36 that extends transversely of, and beneath, the pitman 4 and is connected at 37 to the pull rod 33. The lever 35 is provided with a hub 38 loosely fitted to the sleeve 17 around the post 15, and said lever has a rearwardly extending arm 39, (see Figs. VI and VII.) The lever arm 39 extends into a position that provides for its being engaged by the rollers 12 of the power head 11. Upon the engagement of either roller 12 with the lever arm 39, movement is imparted to said lever arm whereby the lever arm 36 carried by the lever 35 is moved rearwardly and serves to impart movement in a similar direction to the pull rod 33, with the result of causing the feeder to be lowered in the feed hopper 2 to force the charge of material delivered into the hopper into the baling chamber. Then as soon as the roller 12 has escaped from the lever arm 39, the feeder is returned to its normal and uplifted position by the retracting spring 30 and the pull connections leading from the power mechanism including the lever 35 are also returned to their normal positions under the influence of said retracting spring. When the lever 35 returns to its normal position, its arm 35 moves into engagement with a stop 40 surmounting the bed member 7, for which engagement the lever arm 39 is preferably provided with a depending lug 41, (see Fig. VII.)

It will be seen from the foregoing that the feeder of my baling press is actuated entirely independently of the mechanism for retracting the pitman and plunger after their forward strokes and that consequently there is no possibility of interference between the feeder operating mechanism and the pitman retracting mechanism.

For the purpose of moving the material delivered into the feed hopper in a forward direction therein, in order that it may be placed immediately beneath the head 26 of the feeder, I employ a presser plate 42 that is suspended within the rear end of the feed hopper at 42', the presser plate being adapted to swing forwardly and rearwardly in front of the supporting arms of the feeder head. The presser plate 42 is free of connection to the feeder and is provided at its rear side with a cam 43 that is adapted to be actuated by the rod 44 mounted in the feeder arms 27 and which is preferably supplied with an anti-friction roller. The rod 44 acts, during the initial forward movement of the feeder, to impart forward movement to the presser plate 42 upon its engagement with the cam 43, whereby said presser plate is moved from the position in full lines Fig. II to the position seen in dotted lines, and restrained in the last named position while the feeder is descending to force a charge of material into the baling chamber.

45 designates a guard plate operable in the baling chamber 1 and the forward end of which is connected to the plunger 3. This guard plate moves with the plunger and serves to prevent the descent of material from the feed hopper into a position back of the plunger when said plunger is near the limit of its forward stroke. The guard plate herein shown is known to be old, and no invention *per se* is herein claimed for it. It is desirable, however, in the use of such guard plates to provide against the plates extending to any material degree beyond the baling chamber and toward the power mechanism when retracted, inasmuch as when there is any material extension in this direction the guard plates in their rear positions project too closely into the path of travel of the free end of the sweep of the power mechanism. To avoid the objectionable feature mentioned, I connect the guard plate to the plunger 3 by a hinge 46 and provide the guard plate with a pair of curved arms 47 that extend upwardly from the rear end of the plate and are operable upon curved guides 48 supported by the feed hopper at their upper ends and by the rock shaft 28 at their lower ends. When the plunger recedes the curved arms 47 are directed upwardly by the guides 48, moving from the position seen in full lines to the position seen in dotted lines, Fig. II whereby the guard plate is folded toward a vertical position instead of being allowed to remain in a horizontal position.

To avoid the possibility of the feeder of my baling press becoming crushed by the plunger upon its forward movement, in the event of the feeder retracting mechanism becoming impaired, I provide a safety means for elevating the feeder and which is operable in conjunction with the plunger.

49 designates lugs projecting upwardly from a plate 50 carried by the plunger 3 and to which the guard plate 45 is hinged. These lugs are adapted to engage lift lugs 51 carried by the hub sleeve of the feeder which surrounds the rock shaft 28 and which are moved to a vertical position directly above the plunger as seen in dotted lines Fig. II when the feeder is moved to a lower position. When the plunger advances in its forward stroke the lugs 49 carried thereby move in a horizontal path that will cause them to strike the lugs 51 carried by the feeder if the feeder is in a lowered position, in which event the lugs 49 by engagement with the lugs 50 act to elevate the feeder to its normal position.

I claim:

1. In a baling press, a feeder, a plunger, power mechanism for imparting a forward stroke to said plunger, and two independently operable mechanisms coöperable with said power mechanism for respectively moving said feeder to operative position and retracting said plunger positively from the power end of the press.

2. In a baling press, a feeder, a plunger, power mechanism for imparting a forward stroke to said plunger, a lever having connection with said feeder and operable by said power mechanism and a lever independent of said first named lever having connection with said plunger and operable by said power mechanism to retract the plunger positively from the power end of the press.

3. In a baling press, a feeder, a plunger, power mechanism for imparting a forward stroke to said plunger and which is provided with a sweep-head and a power head, a lever having connection with said feeder to move it to operative position, and a lever having connection with said plunger to retract it; one of said levers being operable by said sweep head and the other lever being operable by said power head positively from the power end of the press.

4. In a baling press, a feeder, a plunger, power mechanism for imparting a forward movement to said plunger and which is provided with a sweep head and a power head, a lever operable by said power head having connection with said feeder to move it to operative position, and a lever operable by said sweep head having connection with said plunger to retract it positively from the power end of the press.

5. In a baling press, a feeder, a plunger, power mechanism for imparting forward stroke to said plunger and which is provided with a sweep head and a power head, a post adjacent to said power mechanism, a sleeve rotatably fitted to said post and provided with a lever arm adapted to be engaged by said sweep head, a lever loosely supported by said post, and operable by said power head, means of connection between said sleeve and said plunger for retracting the plunger, and means of connection between said lever and said feeder for moving the feeder to operative position.

6. In a baling press, a feeder, a plunger, power mechanism for imparting forward stroke to said plunger and which is provided with a sweep head and a power head, a post adjacent to said power mechanism, a sleeve rotatably fitted to said post and provided with a lever arm adapted to be engaged by said sweep head, connecting means between said sleeve and said plunger for retracting the plunger upon the rotation of said sleeve by said sweephead, and a lever loosely fitted to said sleeve having connection with said feeder and operable by said power head.

7. In a baling press, a feeder supporting shaft, a feeder having a pivot sleeve mounted on said shaft, and a plunger adapted to engage the pivot sleeve of said feeder to elevate the feeder.

8. In a baling press, a plunger, a feeder pivotally mounted, having a pivot sleeve provided with a lug, and means carried by said plunger for engagement with the lug on said pivot sleeve to move said feeder to an elevated position.

HENRY L. WHITMAN.

In the presence of—
Wm. H. Scott,
E. M. Harrington.